Jan. 30, 1968  M. M. NUSS ET AL  3,366,774
CARBON WIRE FEED TIP FOR WELDING MACHINE
Filed Nov. 30, 1966
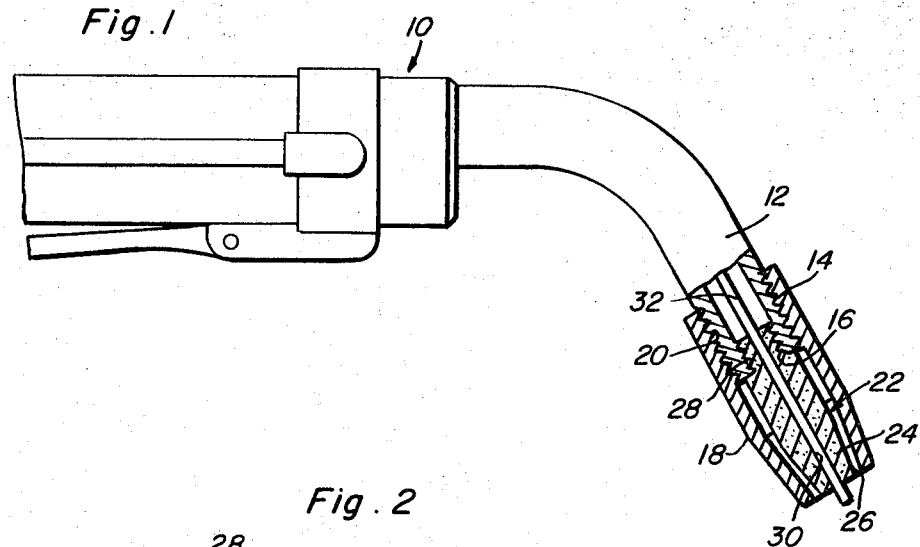
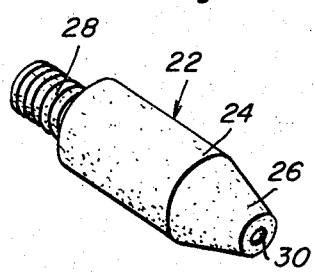
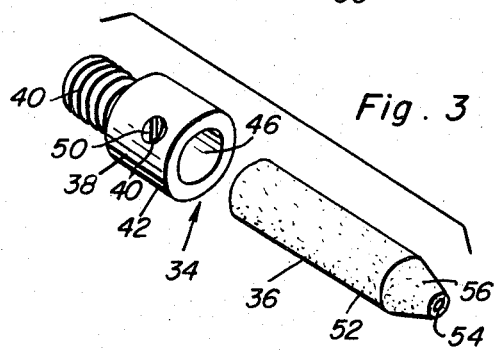
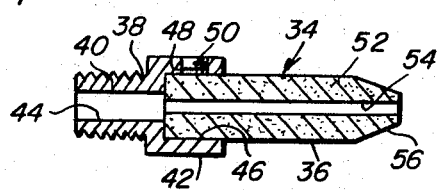
Maynard M. Nuss
Norman Cadle
INVENTORS
BY Clarence A. O'Brien
and Harvey B. Jacobson
Attorneys 3,366,774
CARBON WIRE FEED TIP FOR
WELDING MACHINE
Maynard M. Nuss, R.D. 294, Patton, Pa. 16668, and
Norman Cadle, R.D. 2, Box 40, Hollidaysburg, Pa.
16648
Filed Nov. 30, 1966, Ser. No. 598,049
4 Claims. (Cl. 219—130)

ABSTRACT OF THE DISCLOSURE

This disclosure pertains to a tubular wire feed tip for the head of a gas metal arc welding machine torch and which is constructed of carbon and adapted to be utilized in lieu of copper or alloy tips.

This invention relates to a carbon contact tip for the head of the torch of a gas metal arc welding machine and more specifically to a contact tip, because of its being constructed of carbon, which promotes the free movement of electrode wire therethrough, eliminates contact tip contamination and weld spatter and also eliminates the problem of "burn back" which sometimes causes irreparable damage to conventional metal tips due to the wire electrode welding itself to the metal contact tip.

Conventional metal tips constructed of copper or specific alloys have a tendency to bind on the wire electrode being fed therethrough and to promote contamination and weld spatter which are two main sources of problems in gas metal arc welding. Further, conventional metallic tips are subject to "burn back" and therefore the main object of this invention is to provide a tip having at least substantial equal electrical conductivity and which will eliminate contact tip contamination and weld spatter as well as "burn back."

A further object of this invention is to provide a tip which may be readily formed by simple stamping or extrusion processes and which will therefore be more economical to produce.

A final object of this invention to be specifically enumerated herein is to provide a tip in accordance with the preceding objects which will be readily adaptable to substantially all gas metal arc welding torches.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of a gas metal arc welding torch with the free end of the head thereof illustrated in longitudinal section and having a carbon tip of the instant invention operatively supported therefrom, the carbon tip as well as the metal nozzle carried by the free end of the head of the torch also being illustrated in longitudinal section;

FIGURE 2 is an enlarged perspective view of the carbon tip illustrated in FIGURE 1;

FIGURE 3 is an exploded perspective view of a modified form of carbon tip including a tubular mounting adapter; and FIGURE 4 is a longitudinal sectional view of the modified form of tip illustrated in FIGURE 3 in an assembled condition.

Referring now more specifically to the drawings the numeral 10 generally designates a gas metal arc welding torch of conventional design including an angulated tubular head 12 which is externally threaded as at 14 and internally threaded as at 16 at its free end.

The head 12 includes a tubular metallic nozzle 18 internally threaded on one end as at 20 and threadedly engaged over the externally threaded free end of the head 12.

The welding wire feed tip of the instant invention is generally designated by the reference numeral 22 and includes an elongated body 24 constructed of extruded, molded or stamped carbon material. The tip 24 is slightly externally tapered as at 26 on one end and includes an externally threaded diametrically reduced end portion 28 on its other end which is removably threadedly engaged in the internally threaded free end of the head 12. The body 24 has a small diameter longitudinal bore 30 formed therethrough and the welding wire 32 being fed through the head 12 of the torch 10 is snugly and slidably received through the bore 30, the latter being longitudinally straight. The tip 22, because of its being constructed of carbon, has little or no tendency to cause binding between the wire 32 and the surfaces of the body 24 defining the bore 30 and contact tip contamination and weld spatter is completely eliminated. Further, the welding wire 30 cannot weld itself to the body 24 since the latter is constructed of carbon and therefore "burn back" is also eliminated.

With reference now more specifically to FIGURES 3 and 4 of the drawings there may be seen a modified form of contact tip generally referred to by the reference numeral 34 and which is of two piece construction including a tip element 36 similar to the body 24 and a tubular adapter 38. The tubular adapter 38 includes an externally threaded diametrically reduced end portion 40 which is threadedly engageable in the internally threaded end portion of the head 12 and a diametrically enlarged end portion 42. A small diameter bore 44 is formed through the tubular adapter 38 and includes a diametrically enlarged counterbore 46 disposed in the diametrically enlarged end portion 42. In addition, the end portion 42 includes a threaded radial bore 48 opening into the counterbore 46 and in which a threaded setscrew 50 is threadedly engaged. The tip element 36 includes an elongated cylindrical body 52 constructed of carbon and including a small diameter bore 54 extending therethrough which is somewhat smaller in diameter than the bore 44. One end of the tip element 36 is externally tapered as at 56 and the other end of the tip element 36 is snugly receivable in the counterbore 46 and removably secured therein by means of the setscrew 50. Of course, the overall length of the tips 22 and 34 is substantially identical although this dimension may vary according to the length of nozzle used in conjunction therewith. Further, the operation of the tip 34 is substantially identical to the tip 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a wire welding torch of the type including a head having a welding wire passage extending therethrough, said passage including an outlet end portion of a predetermined size adapted to loosely receive a welding wire therethrough, an elongated welding wire feed tip having a feed bore formed therethrough appreciably smaller in diameter than the diameter of said passage, said tip being supported from said head with the corresponding end of said bore aligned with said outlet end of said passage, said bore being of a size to snugly slidingly receive said wire therethrough, at least the portions of said tip defining said bore being constructed of a conductive refractory material and comprising the only conductive portion of said torch adapted to be disposed in intimate electrical contact wtih said wire, whereby the portions of said tip defining said bore will constitute the sole source of electrical contact with said wire and said tip will not be subject to burn-back and fusion to said wire.

2. The combination of claim 1 wherein said one end of said tip is externally threaded and threadedly engaged with said head.

3. The combination of claim 1 wherein said tip, in its entirety, is constructed of carbon.

4. The combination of claim 1 including a tubular adapter, said adapter having one end thereof removably supported from said head in alignment with the outlet end of said passage, and said tip having one end thereof removably secured in the other end of said adapter, the passage defined through said adapter also being appreciably greater in diameter than the diameter of said bore.

References Cited
UNITED STATES PATENTS

| | | | |
|---|---|---|---|
| 1,491,379 | 4/1924 | Cera | 219—144 |
| 2,735,920 | 2/1956 | Valliere | 219—130 |
| 2,769,894 | 11/1956 | Rives | 219—130 |
| 3,309,491 | 3/1967 | Jacobs | 219—74 |

RICHARD M. WOOD, *Primary Examiner.*